April 13, 1943.  M. KNOBEL ET AL  2,316,255
ANEMOMETER
Filed Nov. 19, 1941  2 Sheets-Sheet 1
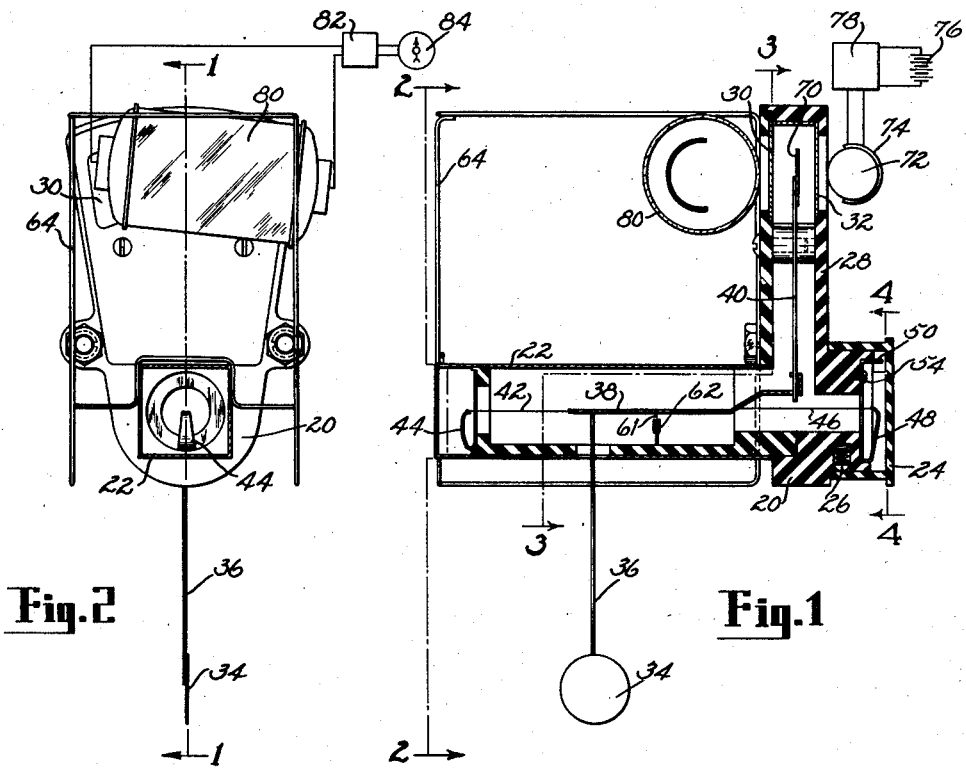
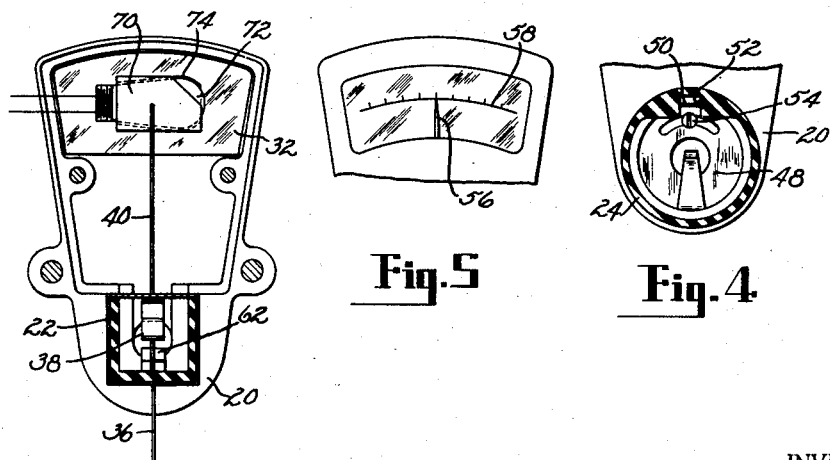
INVENTORS
Max Knobel
Robert Henry Packard
BY Spencer Hardman and Faber
Attorneys April 13, 1943.    M. KNOBEL ET AL    2,316,255
ANEMOMETER
Filed Nov. 19, 1941    2 Sheets-Sheet 2

INVENTORS
Max Knobel
BY Robert Henry Packard
Spencer Hardman and Fehr
attorneys

Patented Apr. 13, 1943

2,316,255

UNITED STATES PATENT OFFICE 2,316,255

ANEMOMETER

Max Knobel, Arlington, and Robert Henry Packard, Newton, Mass., assignors, by mesne assignments, to General Motors Corporation, Dayton, Ohio, a corporation of Delaware Application November 19, 1941, Serial No. 419,762

4 Claims. (Cl. 73—228)

This invention relates to anemometers and more particularly to anemometers capable of measuring or comparing air-flow at low velocities.

In attempting to measure air-flow in refrigerators, it was found that the anemometers on the market were inoperative or unreliable at such low air velocities. The manufacturers of anemometers made no pretension that their product would measure an air-flow of less than 10 ft. per minute.

It is an object of our invention to provide a sensitive anemometer which is capable of satisfactorily measuring air-flow at rates below the limits at which the present anemometers are operative.

It is another object of our invention to provide a sensitive anemometer which will satisfactorily measure air movement of less than 5 ft. per minute.

It is another object of our invention to provide a sensitive anemometer which will satisfactorily measure air movement within refrigerators.

It is still another object of our invention to provide a small compact anemometer which presents little obstruction to air movement and which can satisfactorily measure air-flow in corners and other small points in space.

In order to accomplish the above objects we have provided a paddle-type vane pivotally mounted on a fine metal ribbon suspension with an indicating arm extending in the opposite direction from the paddle-type vane. The vane and the arm together are so proportioned as to be in substantially static balance. In order to further increase the sensitivity of the instrument and to enable the instrument to be read from a remote point, such as outside of the refrigerator, the indicating arm is provided with a shadow vane or shield which cuts a beam of light extending to a photoelectric cell which controls a small electric current which in turn is amplified and measured by a galvanometer type instrument which is calibrated to indicate the flow of air in feet per minute.

Further objects and advantages of the present invention will be apparent from the following description, reference being had to the accompanying drawings, wherein a preferred form of the present invention is clearly shown.

In the drawings:

Fig. 1 is a sectional view of the instrument taken along the lines 1—1 of Fig. 2;

Fig. 2 is a sectional view taken along the lines 2—2 of Fig. 1;

Fig. 3 is a sectional view taken along the lines 3—3 of Fig. 1;

Fig. 4 is a sectional view taken along the lines 4—4 of Fig. 1;

Fig. 5 shows a modified form of indicating means;

Figure 6:
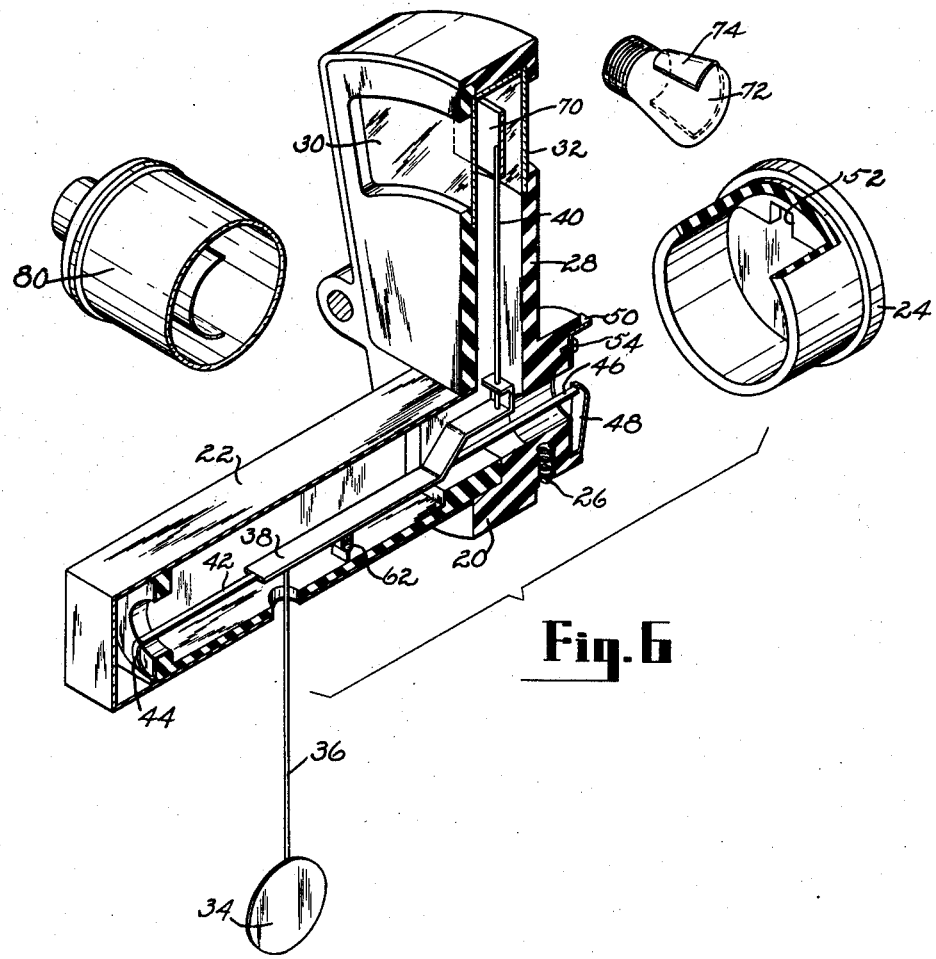
Figure 7:
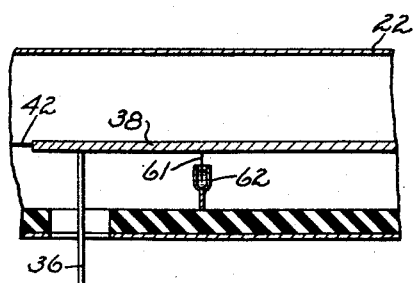

Fig. 6 is an exploded sectional perspective view taken along the line 1—1 of Fig. 2 with the wire frame 64 omitted; and Fig. 7 is an enlarged central fragment of a section taken along the line 1—1 of Fig. 2.

Referring now to the drawings, there is shown an instrument casing 20, one end of which is enclosed by a square tube of metal 22. The other end of the casing is provided with an adjustable cap 24 whose movements are controlled by a friction detent 26. The casing is also provided with a sector-shape projection 28 having windows 30 and 32 on opposite sides. The instrument is shown full size in the drawings so that it will be seen that it is quite small and compact.

The operating member of the instrument is a paddle-type vane 34 of a thin light weight material such as aluminum foil. This is mounted upon the end of an arm 36 formed of thin stiff wire which has its other end fastened to a metal strip 38. At one end of the metal strip 38 there is fastened another arm 40 of this stiff wire or other suitable material which may serve as a pointer for indicating purposes, or it may form some part of the indicating means. The metal strip 38 is supported by a very fine metal ribbon. It may either be fastened to a single continuous strip of metal ribbon, or the metal ribbon may be in two parts, as shown. The metal ribbon 42 has its one end fastened adjacent the end member 38 while the other end of the ribbon 42 is fastened to the spring anchoring member 44 which is mounted in the end of the casing 20 in such a way that it may be rotated for factory adjustment purposes. Adjacent the other end of the metal strip 38 another piece of similar metal ribbon 46 is fastened by solder or other suitable means. The other end of this metal ribbon 46 is fastened to the spring anchoring ring 48, provided with a projection 50 extending into a notch 52 in the adjustable cap 24. The ring 48 is provided with an accurate slot through which extends a clamping screw 54 which may be used to prevent adjustment of the instrument when desired.

In the modified form, as illustrated in Fig. 5, the arm 40 is provided with a pointed end 56 which cooperates with a scale 58 preferably calibrated to directly indicate air movement in feet per minute by the effect of the flow of air upon the paddle vane 34. The metal ribbon sections 42 and 46 normally tend to hold the paddle vane in a neutral position when there is no air movement. However, when the instrument and particularly the paddle vane 34 is placed in the path of air movement, the paddle vane will be deflected and will rotate about the axis of the metal ribbon sections 42 and 46. These metal ribbon sections are always kept under adequate tension by the spring anchoring members 44 and 48, each of which have a cantilever-shaped spring section. The metal ribbon suspension provides a resistance to the movement of the paddle vane 34 in accordance with the deflection of the vane. The deflection of the vane 34 by the air striking one of its faces provides an accompanying deflection of the pointer 56. The scale 58 is calibrated and cooperates with the pointer 56 so that the deflections of the paddle vane 34 may be read directly in feet per minute of air movement upon the scale of 58. The metal ribbon type of suspension makes it possible to measure air movements of less than 5 ft. per minute. If it is desired to make the instrument even more sensitive it is only necessary to increase the size of the vane 34.

The metal ribbon suspension together with the paddle vane 34 and the indicating arm 40 form a mass upon the metal ribbon suspension which has a natural period of vibration. In order to eliminate as far as possible the effects of this natural period of vibration upon the operation of the instrument I have provided an oil vibration damping device. For this purpose, within the casing 20, I have provided a small oil trough 62 which is sufficiently narrow and small to hold oil therein by capillary attraction. Projecting into the oil held in this trough 62 is a fine wire 61 which is fastened to the metal strip 38. The oil in the trough 62 resists any rapid vibrating movement of the wire 61 and thus acts as a vibration damper to eliminate to a great degree the natural period of vibration of the metal ribbon suspension.

In order that the instrument may be readily placed in various positions to measure both horizontal and vertical air-flow, I have provided a thin wire frame 64 so that the instrument may be laid down upon any flat surface in either a horizontal or vertical position. However, if desired, the wire frame may be so formed that the instrument may be laid down in other positions. The wire frame is so thin that it will not materially obstruct the flow of air and it is only the general L-shaped portion of the instrument disclosed in Fig. 1 which presents any material obstruction to the flow of air.

In many cases, the reading of the instrument directly upon a scale such as is illustrated in Fig. 5, would disturb the air measurement sought to be measured. Also, it is often desired that the indications of the air movement be read at some remote point, for example, when it is desired to measure air movement within a refrigerator, the opening of the door to read the instrument would disturb the air movement sought to be measured. I have therefore provided a means by which the instrument provides the indication of the air-flow at a remote point and at the same time makes the instrument even more sensitive.

For this purpose, in the form shown in Figs. 1 to 4 I have provided a shield or shadow vane 70 upon the upper end of the arm 40 instead of a pointer. In either embodiment the paddle vane 34 is located substantially 180° from the pointer 56 or the shadow vane 70 and is of substantially the same mass and moment of inertia, so that the entire mass which is supported upon the ribbon suspension will be in substantial static balance, so that the instrument may be used in any position substantially equally well. Upon the outside of the window 32 I provide a small light bulb 72, such as is commonly used for flash lights. This light bulb 72 is provided with a suitable reflector 74 so that its light would be directed through the window 32. The bulb 72 is provided with electric energy from a suitable source 76 which may be provided with a suitable voltage or current control 78 so that the current supplied to the bulb 72 and the light emitted by the bulb 72 will be as substantially uniform as possible.

Upon the other side of the instrument adjacent the window 30 I provide a photoelectric cell 80 which may be connected through long flexible electrical conductors to the amplifying device 82 connected in turn to a galvanometer type instrument 84 which will provide a visual indication of the current controlled by the cell 80. The shadow vane or shield 70 is so shaped that with increasing deflection of the paddle vane 34, an increasing amount of light from the bulb 72 will be allowed to pass through windows 32 and 30 to the photoelectric cell 80 which in turn will provide an electric current substantially in proportion to the deflection of the vane. The galvanometer instrument 84 is provided with a scale properly calibrated to read the deflections in feet per minute of the air flowing in the immediate vicinity of the paddle vane 34. Thus this provides an arrangement which makes it possible to read at a remote point the air movement contacting the paddle vane 34 and at the same time through the photoelectric cell and amplifying arrangement the sensitivity is increased because through the amplification it is possible to cause the galvanometer type instrument to deflect a greater amount than the simple pointer 56 shown in Fig. 5.

While the form of embodiment of the invention as herein disclosed, constitutes a preferred form, it is to be understood that other forms might be adopted, all coming within the scope of the claims which follow.

What is claimed is as follows:

1. An anemometer comprising a plurality of spaced supports, a metal wire suspending means extending between the supports, spring means adjacent one of the supports for keeping the wire stretched between the supports, a plurality of arms mounted upon said suspending means, a vane exposed to air flow mounted upon one of the arms, an indicating means provided upon another of the arms.

2. An anemometer comprising a plurality of spaced supports, a metal wire suspending means extending between the supports, spring means adjacent one of the supports for keeping the wire stretched between the supports, a plurality of arms mounted upon said suspending means, a vane exposed to air flow mounted upon one of the arms, an indicating means provided upon another of the arms, and an adjusting means for twisting one end of the suspending means to adjust the operation of the arms.

3. An anemometer comprising a plurality of spaced supports, a metal wire suspending means extending between the supports, spring means adjacent one of the supports for keeping the wire stretched between the supports, a plurality of arms mounted upon said suspending means, a vane exposed to air flow mounted upon one of the arms, a light source, a light responsive means located in the path of light from said light source, and a shield carried by another of the arms for disturbing the passage of light from said light source to said light responsive means.

4. An anemometer comprising a plurality of spaced supports, a metal wire suspending means extending between the supports, spring means adjacent one of the supports for keeping the wire stretched between the supports, a plurality of arms mounted upon said suspending means, a vane exposed to air flow mounted upon one of the arms, an indicating means provided upon another of the arms, a trough of capillary size, a liquid held in the trough by capillary action, one of said arms extending into contact with the liquid in said trough for damping vibrations.

MAX KNOBEL.
ROBERT HENRY PACKARD.